(12) United States Patent
Takahashi et al.

(10) Patent No.: US 10,070,501 B2
(45) Date of Patent: Sep. 4, 2018

(54) LIGHTING SYSTEM AND SUPPORT APPARATUS

(71) Applicant: Panasonic Corporation, Osaka (JP)

(72) Inventors: Akira Takahashi, Osaka (JP); Kazushige Sugita, Hyogo (JP); Kazuhiro Takeda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/389,130

(22) PCT Filed: Mar. 12, 2013

(86) PCT No.: PCT/JP2013/001588
§ 371 (c)(1),
(2) Date: Sep. 29, 2014

(87) PCT Pub. No.: WO2013/150719
PCT Pub. Date: Oct. 10, 2013

(65) Prior Publication Data
US 2015/0061512 A1 Mar. 5, 2015

(30) Foreign Application Priority Data
Apr. 5, 2012 (JP) .................. 2012-086536

(51) Int. Cl.
*H05B 37/02* (2006.01)
*H05B 33/08* (2006.01)
(Continued)

(52) U.S. Cl.
CPC ........ *H05B 37/0227* (2013.01); *G01J 5/0025* (2013.01); *G01J 5/04* (2013.01);
(Continued)

(58) Field of Classification Search
CPC . H05B 37/0227; H05B 37/02; H05B 33/0854
See application file for complete search history.

(56) References Cited

U.S. PATENT DOCUMENTS 4,433,328 A * 2/1984 Saphir .................. G08B 13/187
250/340
5,455,487 A * 10/1995 Mix ....................... H05B 37/02
315/150
(Continued)

FOREIGN PATENT DOCUMENTS

JP 03-134996 6/1991
JP 06-223975 8/1994
(Continued)

OTHER PUBLICATIONS

Lajšner, Pavel, Infrared Remote Control Techniques on MC9S08RC/RD/RE/RG Family, Freescale Semiconductor Application Note AN3053, 2008.*
(Continued)

*Primary Examiner* — Douglas W Owens
*Assistant Examiner* — Pedro C Fernandez
(74) *Attorney, Agent, or Firm* — Renner Otto Boisselle & Sklar, LLP (57) ABSTRACT

A lighting system includes: a lighting apparatus including a first human detection sensor unit that detects a person in a first detection area, and a light source that turns ON when the first human detection sensor unit detects the person; and a support apparatus including (i) a second human detection sensor unit that detects a person in a second detection area, and (ii) an emission unit that emits, when the second human detection sensor unit detects the person, infrared rays to cause the first human detection sensor unit to react as if the person is present in the first detection area.

11 Claims, 8 Drawing Sheets (51) Int. Cl.
*G01J 5/00* (2006.01)
*G01J 5/08* (2006.01)
*G01J 5/04* (2006.01)

(52) U.S. Cl.
CPC .......... *G01J 5/0806* (2013.01); *G01J 5/0896* (2013.01); *H05B 33/0854* (2013.01); *H05B 37/0272* (2013.01); *Y02B 20/44* (2013.01)

(56) References Cited

U.S. PATENT DOCUMENTS

| | | | | |
|---|---|---|---|---|
| 5,489,827 | A * | 2/1996 | Xia | H05B 37/0227 315/154 |
| 5,546,211 | A * | 8/1996 | Devon | H04B 10/114 398/202 |
| 5,903,374 | A * | 5/1999 | Kobayashi | H04B 10/1143 398/129 |
| 6,107,938 | A * | 8/2000 | Du | H03K 17/941 307/117 |
| 6,404,079 | B1 * | 6/2002 | Hsieh | F21V 23/04 307/116 |
| 6,700,123 | B2 * | 3/2004 | Musiel | G02B 23/12 250/330 |
| 7,329,998 | B2 * | 2/2008 | Jungwirth | H05B 33/0815 315/149 |
| 7,895,791 | B2 * | 3/2011 | Miller et al. | 49/42 |
| 8,111,131 | B2 * | 2/2012 | Zaveruha | F21V 23/0442 340/3.1 |
| 8,214,084 | B2 * | 7/2012 | Ivey et al. | 700/275 |
| 8,427,076 | B2 * | 4/2013 | Bourquin et al. | 315/307 |
| 8,476,565 | B2 * | 7/2013 | Verfuerth | H05B 37/0272 250/205 |
| 8,497,634 | B2 * | 7/2013 | Scharf | 315/149 |
| 8,587,415 | B1 * | 11/2013 | Followell | G08C 23/04 250/338.1 |
| 8,947,000 | B2 * | 2/2015 | Chen | H03K 17/133 315/159 |
| 2015/0123547 | A1 * | 5/2015 | Fushimi | 315/155 |
| 2015/0123572 | A1 * | 5/2015 | Takeda et al. | 315/307 |

FOREIGN PATENT DOCUMENTS

| | | |
|---|---|---|
| JP | 2003-036982 | 2/2003 |
| JP | 2011-228151 | 11/2011 |

OTHER PUBLICATIONS

Pavel Lajšner, Infrared Remote Control Techniques on MC9S08RC/RD/RE/RG Family, Freescale Semiconductor Application Note AN3053, 2008.*
International Search Report for corresponding International Application No. PCT/JP2013/001588 dated May 14, 2013.
Form PCT/ISA/237 for corresponding International Application No. PCT/JP2013/001588 dated May 14, 2013.

* cited by examiner

LIGHTING SYSTEM AND SUPPORT APPARATUS

TECHNICAL FIELD

The present invention relates to lighting systems, and particularly relates to a lighting system including a lighting apparatus in which lighting is controlled by a human detection sensor and a support apparatus that supports detection by the human detection sensor.

BACKGROUND ART

Light emitting diodes (LEDs) are used in lamps or the like as highly-efficient and space-saving light sources. Especially, LED lamps including LEDs are drawing attention as alternative illumination light sources for conventionally-known fluorescent lights or incandescent light bulbs.

Meanwhile, a lighting apparatus including a human detection sensor has been known conventionally. Such a lighting apparatus includes a human detection sensor provided to its light fixture to which a lamp (illumination light source) is attached, and the lamp turns ON when the human detection sensor detects a person.

Moreover, for example, a bulb-shaped LED lamp including a human detection sensor has been proposed. For example, Patent Literature (PTL) 1 discloses a bulb-shaped LED lamp including a human detection sensor.

Using such a bulb-shaped LED lamp including a human detection sensor allows a conventional lighting apparatus to be used as a lighting apparatus that turns ON according to the human detection sensor. It is easily accomplished by such a lighting apparatus including the human detection sensor to automatically turn ON when a person is present and automatically turn OFF when a person is not present.

CITATION LIST

Patent Literature

[PTL 1] Japanese Unexamined Patent Application Publication No. 2011-228151

SUMMARY OF INVENTION

Technical Problem

A problem that may arise for the aforementioned lighting apparatus including such a human detection sensor is that a detection area in which the human detection sensor detects a person is restricted by the configuration of the lighting apparatus, use environment, or the like.

In view of the above, an object of the present invention is to provide a lighting system capable of extending the detection area in which a human detection sensor detects a person, regardless of the configuration of the lighting apparatus or the like.

Solution to Problem

In order to solve the aforementioned problem, a lighting system according to an aspect of the present invention includes: a lighting apparatus including a first human detection sensor unit that detects a person in a first detection area, and a light source that turns ON when the first human detection sensor unit detects the person; and a support apparatus including (i) a second human detection sensor unit that detects a person in a second detection area which is different from the first detection area, and (ii) an emission unit that emits, when the second human detection sensor unit detects the person, a detection wave for causing the first human detection sensor unit to react as if the person is present in the first detection area.

Moreover, the first human detection sensor unit may detect the person by infrared rays, and when the second human detection sensor unit detects the person in the second detection area, the emission unit may emit infrared rays as the detection wave to cause the first human detection sensor unit to detect the emitted infrared rays.

Moreover, the emission unit may emit the infrared rays having a wavelength of at least 3 μm and at most 15 μm.

Moreover, the emission unit may emit the infrared rays having a modulation frequency of 1 kHz or less.

Moreover, the support apparatus may include a movable unit which changes an emission direction of the detection wave to be emitted from the emission unit.

Moreover, the support apparatus may include a wavelength adjustment unit configured to change a wavelength of the detection wave to be emitted from the emission unit.

Moreover, the second human detection sensor unit may detect the person by infrared rays, a wavelength range of the detection wave detectable by the second human detection sensor unit may be the same as a wavelength range of the detection wave to be emitted from the emission unit, and a modulation frequency bandwidth of the detection wave detectable by the second human detection sensor unit may be the same as a modulation frequency bandwidth of the detection wave to be emitted from the emission unit.

Moreover, the emission unit may emit the detection wave in at least two directions simultaneously.

Moreover, when the first human detection sensor unit detects the person, the light source may turn ON and continue to be ON for a certain period of time and when the second human detection sensor unit detects the person in the second detection area, the emission unit may emit the detection wave a plurality of times at a predetermined time interval, the predetermined time interval being shorter than the certain period of time.

Moreover, a support apparatus according to an aspect of the present invention is a support apparatus that supports detection by a lighting apparatus that turns ON when the lighting apparatus detects a person in a first detection area, the support apparatus including: a second human detection sensor unit that detects a person in a second detection area which is different from the first detection area; and an emission unit that emits, when the second human detection sensor unit detects the person, a detection wave for causing the lighting apparatus to react as if the person is present in the first detection area.

Advantageous Effects of Invention

According to the present invention, it is possible to implement a lighting system including a lighting apparatus provided with a human detection sensor, in which a detection area detectable by the human detection sensor is extended.

BRIEF DESCRIPTION OF DRAWINGS

FIG. 3 is a sectional view illustrating a configuration of a lighting apparatus according to Embodiment 1.

DESCRIPTION OF EMBODIMENTS (Underlying Knowledge Forming Basis of the Present Invention)

First, underlying knowledge forming the basis of the present invention is described with reference to FIG. 1.

Figure 1:
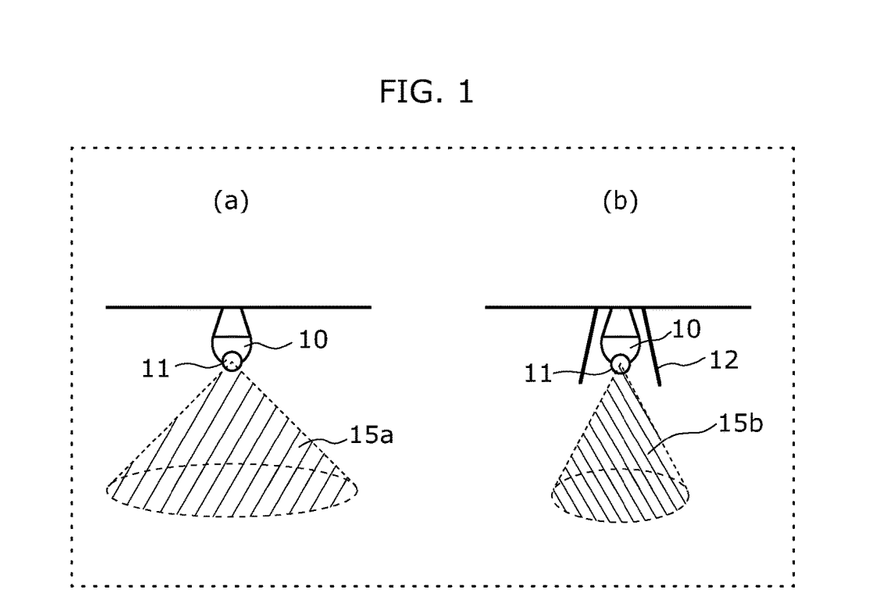
FIG. 1 is a diagram for illustrating a problem of a lighting apparatus including a human detection sensor.

FIG. 1 is a diagram for illustrating a problem of a lighting apparatus including a human detection sensor.

In the lighting apparatus including a human detection sensor, the configuration of the lighting apparatus or the use environment may narrow a range in which the human detection sensor can detect presence of a person (detection area).

For example, as illustrated in (a) in FIG. 1, in the case of a bulb-shaped LED lamp 10 which includes a human detection sensor 11, the human detection sensor 11 is provided to the surface of the lamp housing because of restrictions due to the lamp shape, the lamp configuration, and the like.

Here, it is assumed that the area in which the human detection sensor 11 can detect the person is a detection area 15a as indicated by the dotted lines in (a) in FIG. 1, if there is nothing that disturbs the detection by the human detection sensor 11.

The LED lamp 10 is provided to an existing light fixture and used as a lighting apparatus, but in this case, the light fixture may disturb the detection by the human detection sensor 11. For example, as illustrated in (b) in FIG. 1, when a light fixture 12 has a so-called "shade", the "shade" disturbs the detection by the human detection sensor 11.

Therefore, the actual area detectable by the human detection sensor 11 is a detection area 15b as indicated by the dotted lines in (b) in FIG. 1, which is narrower than the detection area 15a. In other words, the detection area of the human detection sensor 11 is restricted by the light fixture 12. The restriction of the detectable area may cause a malfunction, for example, the lighting apparatus does not turn ON unless a person gets very close to the lighting apparatus.

The present invention relates to a lighting system that allows a human detection sensor included in a lighting apparatus to extend the detection area of the human detection sensor, and that can control the lighting adequately in order to solve the aforementioned problems.

Hereinafter, embodiments of the present invention are described with reference to the drawings.

It should be noted that each of the embodiments described below shows a specific example of the present invention. The values, shapes, materials, structural components, layout and connection of the structural components, steps, and the order of the steps in the following embodiments are mere examples, and are not intended to limit the scope of the present invention. Therefore, among the structural components in the following embodiments, structural components not recited in any one of the independent claims which indicate the broadest concepts of the present invention are described as optional structural components.

Embodiment 1

Figure 2:
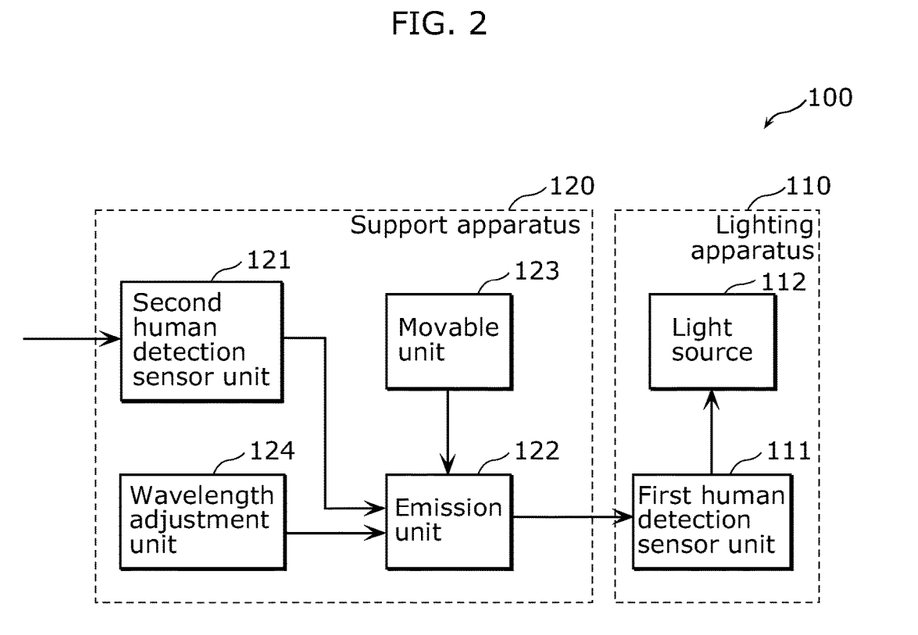
FIG. 2 is a block diagram illustrating a configuration of a lighting system according to Embodiment 1 of the present invention.

FIG. 2 is a block diagram illustrating a configuration of a lighting system according to Embodiment 1 of the present invention.

A lighting system 100 includes a lighting apparatus 110 and a support apparatus 120.

The lighting apparatus 110 includes a first human detection sensor unit 111 and a light source 112. The lighting apparatus 110 is, for example, a lighting apparatus that is used at the entrance of an ordinarily house or the like, and that turns ON and continues to be ON for a certain period of time when a person is detected.

The first human detection sensor unit 111 detects a person in a first detection area. In Embodiment 1, the first human detection sensor unit 111 detects infrared rays radiated from the human body in the first detection area. Furthermore, the first human detection sensor unit 111 detects infrared rays emitted from the support apparatus 120.

The light source 112 turns ON when the first human detection sensor unit 111 detects the person. For example, when the first human detection sensor unit 111 detects the person, the light source 112 turns ON and continues to be ON for a certain period of time, and then turns OFF. The light source 112 is a bulb-shaped LED lamp (LED) in Embodiment 1.

The support apparatus 120 includes a second human detection sensor unit 121, an emission unit 122, a movable unit 123, and a wavelength adjustment unit 124. The support apparatus 120 is an apparatus for controlling the turning ON of the lighting apparatus 110 by emitting a detection wave for the lighting apparatus 110. It should be noted that the lighting apparatus 110 and the support apparatus 120 are not electrically connected to each other.

The second human detection sensor unit 121 detects a person in a second detection area which is different from the first detection area. In Embodiment 1, the second human detection sensor unit 121 detects infrared rays radiated from the human body in the second detection area.

When the second human detection sensor unit 121 detects the person, the emission unit 122 emits the detection wave to the first human detection sensor unit 111 to cause the first human detection sensor unit 111 to react as if the person is present in the first detection area. Specifically, the emission unit 122 emits infrared rays as the detection wave. Here, the wavelength of the infrared rays emitted from the emission unit 122 is at least 3 µm and at most 15 µm. Usually, the wavelength of the infrared rays radiated from a human body ranges approximately from 5 to 7 µm, and the wavelength of the infrared rays emitted from the emission unit 122 is set to include this range.

Furthermore, a modulation frequency of the infrared rays emitted from the emission unit 122 is 1 kHz or less. The modulation frequency of the infrared rays generally used for a remote controller of a television or the like is 1 kHz or more. Therefore, by setting the modulation frequency to 1 kHz or less, the infrared rays emitted from the remote controller of the television or the like is discriminated from the infrared rays emitted from the support apparatus 120, thereby preventing malfunctioning of the lighting apparatus.

The infrared rays emitted from the emission unit 122 are detectable by the first human detection sensor unit 111 that is approximately 10 m away from the emission unit 122, as with the above-mentioned TV remote controller.

It should be noted that in Embodiment 1, the wavelength range of the infrared rays that is detectable by the second human detection sensor unit 121 is the same as the wavelength range of the infrared rays to be emitted from the emission unit 122. Moreover, the modulation frequency bandwidth of the infrared rays that is detectable by the second human detection sensor unit 121 is the same as the modulation frequency bandwidth of the infrared rays to be emitted from the emission unit 122.

The movable unit 123 changes the emission direction of the infrared rays to be emitted from the emission unit 122.

The wavelength adjustment unit 124 changes the wavelength of the infrared rays to be emitted from the emission unit 122. Specifically, the wavelength of the infrared rays to be emitted from the emission unit 122 is changed within the above-mentioned wavelength range of at least 3 µm to at most 15 µm.

Next, more detailed configurations of the lighting apparatus 110 and the support apparatus 120 are described.

First, a detailed configuration of the lighting apparatus 110 is described.

FIG. 3 is a sectional view illustrating the configuration of the lighting apparatus according to Embodiment 1.

The lighting apparatus 110 is a light fixture 152 provided with a bulb-shaped LED lamp 150 that includes a human detection sensor 151 in this embodiment.

The LED lamp 150 has an envelope including a globe 153, a housing 154, and a base 155. The envelope contains an LED 156, a base platform 20, a circuit case 157 including internally a circuit unit, and the human detection sensor 151.

The globe 153 is a hemispheric translucent cover for releasing the light emitted from the LED 156 to outside of the lamp. Furthermore, the LED 156, the human detection sensor 151, and the circuit case 157 are partially covered by the globe 153. The light of the LED 156 entered into the inner surface of the globe 153 passes through the globe 153 and is released to outside of the globe 153. An opening provided to the globe 153 has a light-guiding component 158 fitted thereto.

The light-guiding component 158 is an optical component which guides light to a light-receiving surface of the human detection sensor 151. The light-guiding component 158 in this embodiment is a convex lens configured in such a way as to collect the infrared rays radiated from a person to the light-receiving surface. The light-guiding component 158 is, for example, a Fresnel lens.

The housing 154 is provided between the globe 153 and the base 155. The housing 154 is a case having openings at both ends, and is configured of a substantially truncated cone component having a substantially cylinder shape with a diameter which gradually narrows from the globe side toward the base side.

The base 155 is a power receiving unit which receives alternative current (AC) power with two contacts, and is attached to the lamp socket of the lighting apparatus 152. The base 155 is, for example, a base of Edison screw (E-type).

The LED 156 is a chip-type LED, and provided inside the globe 153. A plurality of LEDs 156 are provided on a mounting board, and the LEDs emit light according to the detection signal from the human detection sensor 151.

The circuit case 157 includes, internally, a board (circuit unit) mounting a driving circuit of the LED 156 and a circuit such as a control circuit of the human detection sensor 151. The circuit case 157 is an insulator and typically a resin.

The human detection sensor 151 is a passive-type human detection sensor and detects a person by detecting change in the strength of the infrared rays entered into the light-receiving surface. In other words, the human detection sensor 151 outputs a detection signal to the circuit included in the circuit case 157 when the human detection sensor 151 detects infrared rays radiated from the human body. Then, the LED 156 turns ON or OFF according to the detection signal. It should be noted that the human detection sensor 151 can detect a living thing other than a person such as an animal that radiates infrared rays if the living thing enters the detection area (detection range).

The light fixture 152 includes a cover made of a material, for example, polycarbonate or glass. The cover is provided in such a way as to surround the LED lamp 150. Moreover, the LED lamp 150 is attached to the socket of the light fixture 152.

It should be noted that the human detection sensor 151, the light-guiding component 158, and the control circuit of the human detection sensor 151 included in the circuit case 157 correspond to the first human detection sensor unit 111 in the block diagram of FIG. 2. Furthermore, the LED 156 and the driving circuit of the LED 156 included in the circuit case 157 correspond to the light source 112 in the block diagram of FIG. 2.

Next, a detailed configuration of the support apparatus 120 is described.

Figure 4:
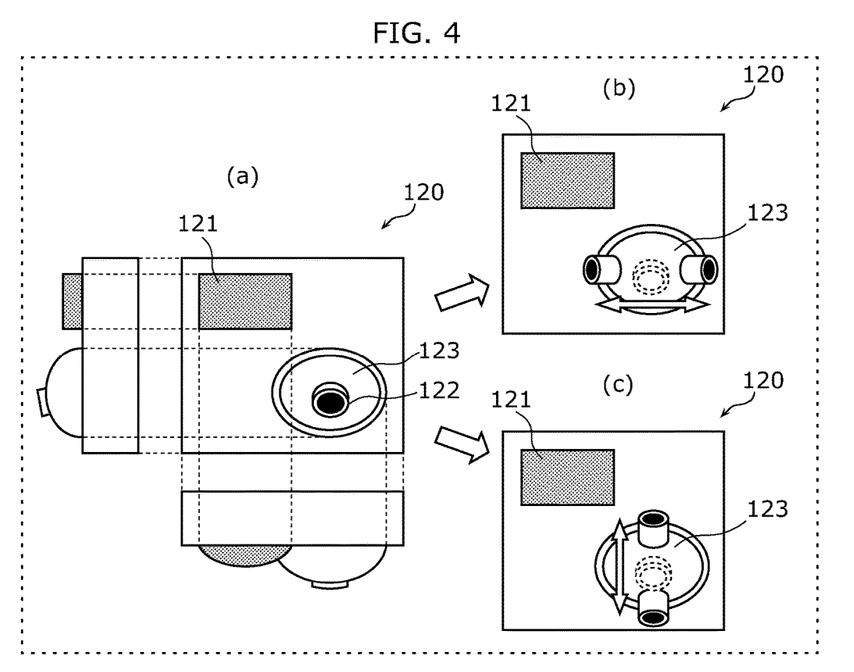
FIG. 4 is a diagram illustrating a support apparatus according to Embodiment 1.

FIG. 4 is a diagram illustrating the support apparatus 120 according to Embodiment 1.

The (a) in FIG. 4 illustrates the support apparatus 120 viewed from above and side.

The support apparatus 120 includes a housing made of a metal or a resin, the second human detection sensor unit 121, the emission unit 122, and the movable unit 123. Although not illustrated, the support apparatus 120 includes the wavelength adjustment unit 124 inside the housing. Although not illustrated, the support apparatus 120 includes a user interface for setting an operation of the support apparatus 120 by a user.

The second human detection sensor unit 121 includes a human detection sensor and its peripheral components. In Embodiment 1, the second human detection sensor unit 121 includes, as with the first human detection sensor unit 111, a human detection sensor, a light-guiding component which guides light to a light-receiving surface of the human detection sensor, and a control circuit of the human detection sensor.

Here, as to the second human detection sensor unit 121, an area where the light-guiding component is providable can be set more flexibly than the area of the LED lamp 150 where the light-guiding component 158 is provided. Similarly, the size of the light-guiding component of the second human detection sensor unit 121 can be set more flexibly than the size of the light-guiding component 158 of the LED lamp 150.

Thus, the light-guiding component of the second human detection sensor unit 121 is designed to collect more infrared rays on the light-receiving surface than the light-guiding component 158 does. In other words, the second detection area is larger than the detection area of the human detection sensor 151 of the LED lamp 150.

Furthermore, as will be described later, the first detection area is a detection area of the human detection sensor 151 which is narrowed by the cover of the light fixture 152. Therefore, the second detection area is broader than the first detection area.

The emission unit 122 emits infrared rays for the lighting apparatus 110 for a certain period of time as described with reference to FIG. 1. Here, "for the lighting apparatus 110" does not necessarily mean toward the lighting apparatus 110. The emission unit 122 may emit infrared rays in such a way that the first human detection sensor unit 111 can detect the infrared rays. For example, the emission unit 122 may emit infrared rays toward a first detection area 161. Moreover, for example, the emission unit 122 may emit infrared rays toward the first human detection sensor unit 111.

Moreover, the emission unit 122 may emit infrared rays a plurality of times at a predetermined time interval when the second human detection sensor unit 121 detects a person.

The lighting apparatus 110 (light source 112) turns ON and continues to be ON for a certain period of time from the last time the first human detection sensor unit 111 detects a person. Thus, when the emission unit 122 emits infrared rays a plurality of times at a predetermined time interval that is shorter than the certain period of time, the lighting time of the lighting apparatus 110 can be adjusted.

For example, if the lighting apparatus 110 turns ON and continues to be ON for three minutes from the last time when the first human detection sensor unit 111 detects a person, the emission unit 122 may emit infrared rays three times at one-minute intervals from when the second human detection sensor unit 121 detects a person. This allows the lighting apparatus 110 to continue to be ON for at least six minutes from when the second human detection sensor unit 121 detects the person (for three minutes from the last time the infrared rays are emitted).

Moreover, the above predetermined period and the number of time of the emission of the infrared rays can be set by a user through a user interface (not illustrated).

It should be noted that in Embodiment 1, the wavelength of the infrared rays to be emitted from the emission unit 122 is changeable within a range of at least 3 μm to at most 15 μm based on the control of the wavelength adjustment unit 124.

Furthermore, the period of time that the emission unit 122 emits infrared rays can be set by a user through the user interface (not illustrated).

Moreover, the emission unit 122 is provided on the spherical movable unit 123. Therefore, the direction of the infrared rays to be emitted from the emission unit 122 is changeable by rotating the movable unit 123.

For example, as illustrated in (b) in FIG. 4, the direction can be changed 180 degrees in a lateral direction (horizontal direction). Moreover, as illustrated in (c) in FIG. 4, the direction can be changed 180 degrees also in an up or down direction (vertical direction). Since the movable unit 123 is spherical, it is of course possible to combine the movements in the horizontal and vertical directions.

The movable unit 123 can be moved by a user by hand. However, the configuration of the movable unit 123 is not limited to this. For example, the support apparatus 120 may include a driving unit to control the movable unit 123 based on electric signals. In this case, the movable unit 123 is moved by the driving unit based on the user's instruction through the aforementioned user interface. Moreover, for example, a lock mechanism may be included for fixing the direction of the infrared rays to be emitted from the emission unit 122.

It should be noted that the infrared rays are invisible with human eyes, and thus adjustment of the emission direction of the emission unit 122 may be difficult. In such a case, for example, a laser pointer may be provided to adjust the emission direction, and an emission target of the emission unit 122 may be set with the laser pointer.

The wavelength adjustment unit 124 changes the wavelength of the infrared rays to be emitted from the emission unit 122.

When the human detection sensor 151 included in the lighting apparatus 110 is configured to detect a change in the infrared rays (temperature change caused by the infrared rays) as in Embodiment 1, the human detection sensor 151 may not detect or may falsely detect a person when there is a small difference between the body temperature of the person and the ambient air temperature. For example, such a case may occur in summertime in Japan.

Accordingly, for example, the wavelength adjustment unit 124 may have a configuration to monitor the ambient air temperature of the support apparatus 120 and emit infrared rays having a temperature definitely higher than the ambient air temperature. Moreover, for example, to make sure that the lighting apparatus 110 detects infrared rays, the wavelength adjustment unit 124 may adjust the wavelength of infrared rays after the infrared rays are emitted for the first time and emit infrared rays having a different wavelength to surely change the temperature of the detection area which is a range in which the human detection sensor 151 of the lighting apparatus 110 can detect a person.

Moreover, the setting of the aforementioned wavelength adjustment unit 124 such as changing the wavelength of the infrared rays may be made by a user via the user interface (not illustrated).

It should be noted that the support apparatus 120 drives by a battery included in the housing. With this, the support apparatus 120 does not need alternating-current (AC) power supply, and thus can be placed anywhere.

Next, operations of the lighting system 100 according to Embodiment 1 are described with reference to FIGS. 5 and 6.

Figure 5:
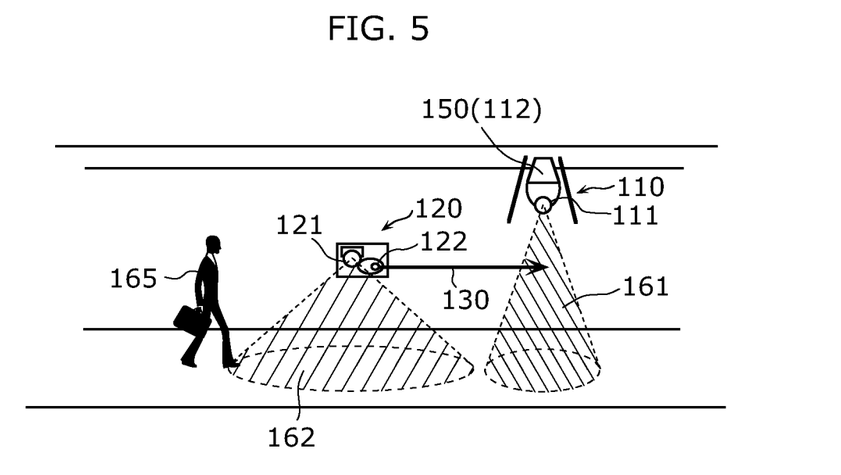
FIG. 5 is a diagram for illustrating operations of the lighting system according to Embodiment 1.

FIG. 5 is a diagram for illustrating operations of the lighting system 100 according to Embodiment 1.

Figure 6:
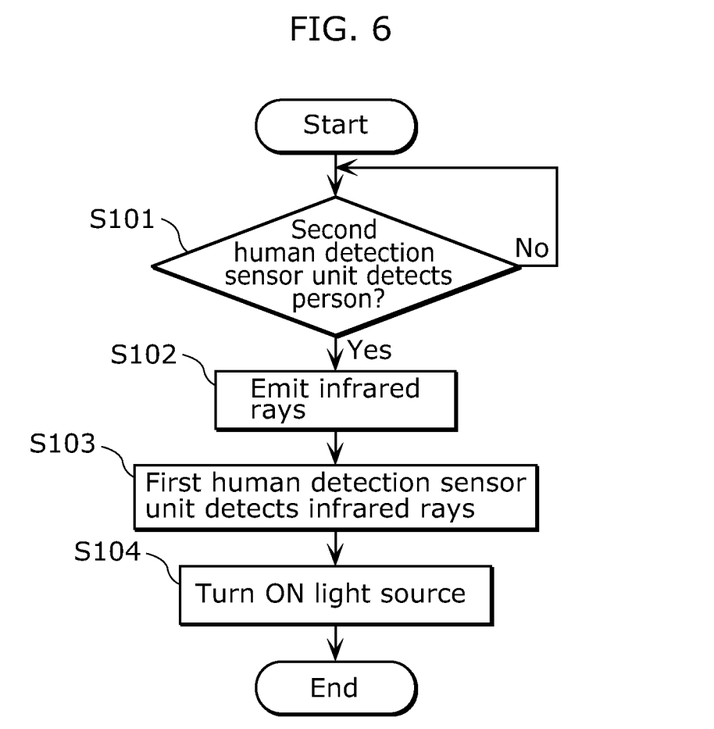
FIG. 6 is a flowchart of the operations of the lighting system according to Embodiment 1.

FIG. 6 is a flowchart of the operations of the lighting system 100 according to Embodiment 1.

First, the support apparatus 120 detects a person in a second detection area 162 by the second human detection sensor unit 121 (No in S101 in FIG. 6).

The second detection area 162 is a three-dimensional space in which the second human detection sensor unit 121 can detect a change in infrared rays, and which is dominantly defined by (i) the human detection sensor and (ii) the light-guiding component which guides light to the light-receiving surface of the human detection sensor. Here, the human detection sensor and the light-guiding component are included in the second human detection sensor unit 121.

When the support apparatus 120 detects a person 165 in the second detection area 162 (Yes in S101 in FIG. 6), the support apparatus 120 emits infrared rays 130 from the emission unit 122 for the lighting apparatus 110 (S102 in FIG. 6). In FIG. 5, the support apparatus 120 emits the infrared rays 130 from the emission unit 122 to the first detection area 161.

The first detection area 161 is a three-dimensional space in which the first human detection sensor unit 111 can detect a change in infrared rays, and which is defined by (i) the human detection sensor 151 (ii) the light-guiding component 158 which guides light to the light-receiving surface of the human detection sensor, and (iii) the cover of the light fixture 152. Here, the human detection sensor 151 and the light-guiding component 158 are included in the first human detection sensor unit 111.

In Embodiment 1, the first human detection sensor unit 111 detects a change in infrared rays. Infrared rays do not pass through polycarbonate, glass, or the like. Therefore, due to the cover of the light fixture 152, the first detection area 161 in which infrared rays are detectable by the first human detection sensor unit 111 is narrower than the detection area in the case where the light fixture 152 does not have the cover.

However, even in such a case where the detection area of the first human detection sensor unit 111 is narrowed, the detection area is extended by the support apparatus 120 in the present invention. In other words, the light source 112 can be turned ON even when a person is present in the second detection area 162 in addition to the case where a person is present in the first detection area 161.

Specifically, the lighting apparatus 110 detects, by the first human detection sensor unit 111, the infrared rays 130 emitted from the emission unit 122 to the first detection area 161 (S103 in FIG. 6). In other words, the support apparatus 120 emits the infrared rays 130 from the emission unit 122 and increases the amount changed in the infrared rays in the first detection area 161 to make it look like as if there is a person in the first detection area 161.

Next, the lighting apparatus 110 turns ON the light source 112 based on the detection by the first human detection sensor unit 111 (S104 in FIG. 6).

It should be noted that in FIG. 5, the first detection area 161 and the second detection area 162 are different detection areas from each other. The different detection areas mean that those detection areas do not completely match. Thus, the first detection area 161 and the second detection area 162 may have an area that overlaps with each other.

As described above, in the present invention, the light source 112 can be turned ON by emitting the infrared rays from the support apparatus 120 even when a person is present in the second detection area 162 in addition to the case where a person is present in the first detection area 161. In other words, according to the present invention, the detection area of the lighting apparatus 110 can be extended.

Moreover, a plurality of support apparatuses 120 may be used to detect a person located in a place farther where the first human detection sensor unit 111 cannot detect the person, and turn ON the light source 112 of the lighting apparatus 110.

Figure 7:
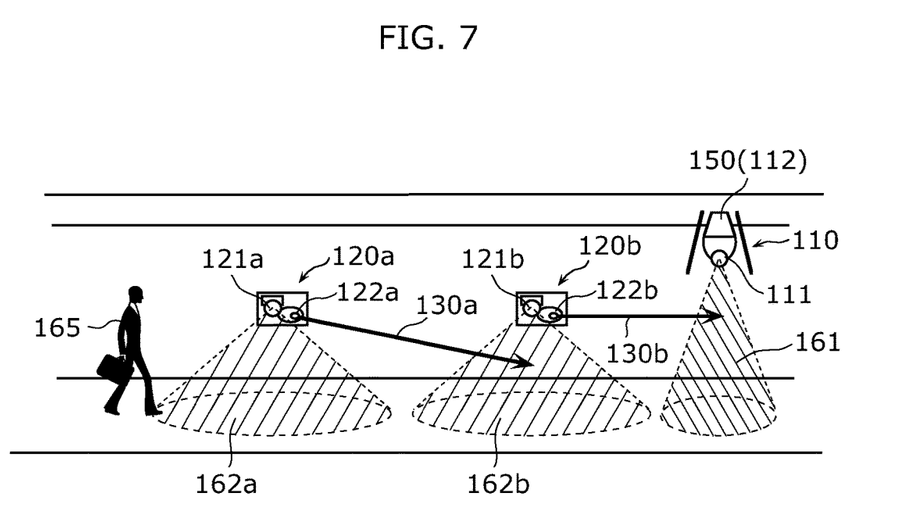
FIG. 7 illustrates an example of the lighting system that turns ON the lighting apparatus by using a plurality of support apparatuses.

FIG. 7 illustrates an example of the lighting system that turns ON the lighting apparatus 110 by using a plurality of support apparatuses 120.

FIG. 7 is a diagram illustrating an example of turning ON the lighting apparatus 110 by using a support apparatus 120a and a support apparatus 120b. Here, the support apparatus 120a and the support apparatus 120b have substantially the same performance.

As described above, in Embodiment 1, the wavelength range of the infrared rays detectable by the second human detection sensor unit 121 is substantially the same as the wavelength range of infrared rays to be emitted from the emission unit 122 in one support apparatus 120. Moreover, the modulation frequency bandwidth of the infrared rays detectable by the second human detection sensor unit 121 is substantially the same as the modulation frequency bandwidth of the infrared rays to be emitted by the emission unit 122 in one support apparatus 120.

In other words, as illustrated in the diagram, the wavelength range of the infrared rays detectable by a second human detection sensor unit 121b of the support apparatus 120b is substantially the same as the wavelength range of infrared rays 130a to be emitted by an emission unit 122a of the support apparatus 120a. Therefore, the second human detection sensor unit 121b detects the infrared rays 130a emitted by the emission unit 122a in addition to a person in a second detection area 162b.

The following describes procedures of the operations of the lighting system illustrated in FIG. 7.

First, the support apparatus 120a detects a person in a second detection area 162a by a second human detection sensor unit 121a.

When the support apparatus 120a detects, by the second human detection sensor unit 121a, the person 165 in the second detection area 162a, the support apparatus 120a emits the infrared rays 130a from the emission unit 122a for the support apparatus 120b. In FIG. 7, the emission unit 122a emits the infrared rays 130a toward the second detection area 162b. The second detection area 162b is an area (space) in which the support apparatus 120b can detect infrared rays using the second human detection sensor unit 121b.

The support apparatus 120b detects, by the second human detection sensor unit 121b, the infrared rays 130a emitted to the second detection area 162a, and emits infrared rays 130b from an emission unit 122b for the lighting apparatus 110. In FIG. 7, the emission unit 122b emits the infrared rays 130b toward the first detection area 161. The first detection area 161 is an area (space) in which the lighting apparatus 110 can detect infrared rays by the first human detection sensor unit 111.

Next, the lighting apparatus 110 detects, by the first human detection sensor unit 111, the infrared rays 130b emitted from the emission unit 122b to the first detection area 161, and turns ON the light source 112.

This makes it possible to detect a person located far away where the first human detection sensor unit 111 cannot detect the person and to turn ON the light source 112 of the lighting apparatus 110.

It should be noted that FIG. 7 is an example, it is of course possible to use three or more support apparatuses 120 to detect a person located far away and turn ON the light source 112 of the lighting apparatus 110 in the same manner.

It should be noted that the emission unit 122 may emit the infrared rays at least two directions simultaneously. In other words, light sources 112 of at least two lighting apparatuses 110 may be turned ON by detecting infrared rays by one support apparatus 120.

Figure 8:
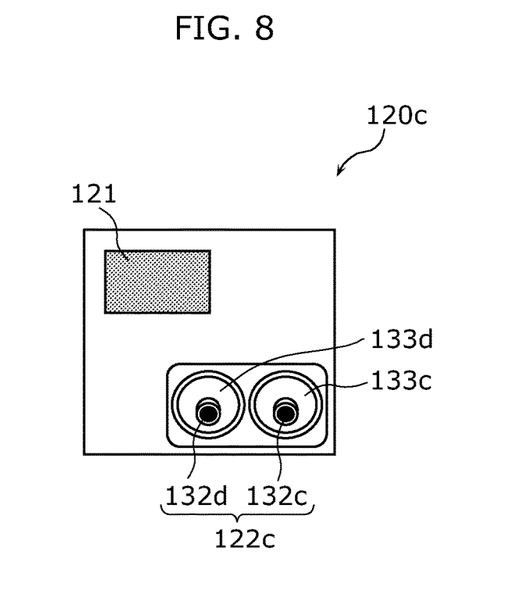
FIG. 8 is a diagram illustrating an example of a support apparatus capable of emitting infrared rays at least two directions simultaneously.

FIG. 8 is a diagram illustrating an example of a support apparatus capable of emitting infrared rays at least two directions simultaneously.

A support apparatus 120c includes the second human detection sensor unit 121, and a first emission unit 132c and a second emission unit 132d as an emission unit 122c. Furthermore, although not illustrated, the support apparatus 120c includes the wavelength adjustment unit 124 inside the housing.

The emission direction of the infrared rays from the first emission unit 132c can be changed by a movable unit 133c, and the emission direction of the infrared rays from the second emission unit 132d can be changed by a movable unit 133d. It should be noted that the configurations of the movable unit 133c and the movable unit 133d are the same as the movable unit 123 described with reference to FIG. 4. Similarly, the configuration of second human detection sensor unit 121 is the same as the second human detection sensor unit 121 described with reference to FIG. 4.

Furthermore, the wavelength of the infrared rays to be emitted from the first emission unit 132c and the wavelength of the infrared rays to be emitted from the second emission unit 132d can be set independently from each other by the wavelength adjustment unit 124 included in the support apparatus 120c.

When the support apparatus 120c can emit infrared rays in two or more directions simultaneously as illustrated in FIG. 8 is used, installing one support apparatus 120c in a branch point for example enables the lighting apparatuses 110 installed in respective branch routes to turn ON.

Figure 9:
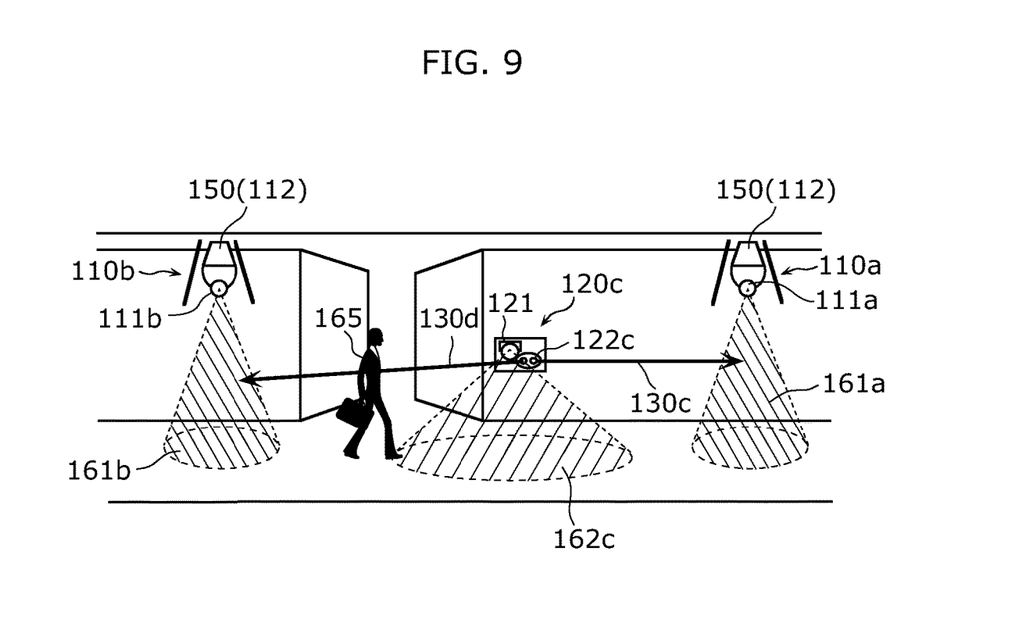
FIG. 9 is a diagram illustrating an example of a lighting system that turns ON lighting apparatuses installed in respective branch routes by having the support apparatus at a branch point.

FIG. 9 is a diagram illustrating an example of a lighting system that turns ON lighting apparatuses installed in respective branch routes by having the support apparatus 120c at a branch point.

In the lighting system illustrated in FIG. 9, one support apparatus 120c causes a lighting apparatus 110a and a lighting apparatus 110b to turn ON. It should be noted that the lighting apparatus 110a and the lighting apparatus 110b have the same configuration as the lighting apparatus described with reference to FIG. 3. Furthermore, in the following description, turning ON the light sources of the lighting apparatus 110a and turning ON the lighting apparatus 110b is simply described as turning ON the lighting apparatus 110a and the lighting apparatus 110b.

The following describes operation procedures of the lighting system illustrated in FIG. 9.

First, the support apparatus 120c detects a person in a second detection area 162c by the second human detection sensor unit 121.

When the second human detection sensor unit 121 detects the person 165 in the second detection area 162c, the support apparatus 120c emits infrared rays 130c from the first emission unit 132c for the lighting apparatus 110a. In FIG. 9, the first emission unit 132c emits the infrared rays 130c to a first detection area 161a. At the same time, the support apparatus 120c emits infrared rays 130d from the second emission unit 132d for the lighting apparatus 110b. In FIG. 9, the second emission unit 132d emits the infrared rays 130d to a first detection area 161b. In other words, the emission unit 122c emits infrared rays in at least two directions simultaneously.

It should be noted that the first detection area 161a is an area in which the lighting apparatus 110a can detect infrared rays by a first human detection sensor unit 111a, and the first detection area 161b is an area in which the lighting apparatus 110b can detect infrared rays by a first human detection sensor unit 111b.

The lighting apparatus 110a detects, by the first human detection sensor unit 111a, the infrared rays 130c emitted from the first emission unit 132c to the first detection area 161a, and turns ON.

Similarly, the lighting apparatus 110b detects, by the first human detection sensor unit 111b, the infrared rays 130d emitted from the second emission unit 132d to the first detection area 161b, and turns ON.

With this, one support apparatus 120 detects the infrared rays and thereby causing two lighting apparatuses 110a and 110b to turn ON.

Such a lighting system is useful when a plurality of lighting apparatuses 110 are installed across a branch point (intersection) or a corner as illustrated in FIG. 9. Moreover, for example, it is of course possible to provide a lighting system in which, with the support apparatus 120c installed in the middle of stairs, lighting apparatuses respectively placed toward the top and bottom of the stairs are both turned ON when a person is detected.

The foregoing has described Embodiment 1 of the present invention. The lighting system according to Embodiment 1 allows the detection area of the lighting apparatus 110 to be extended by using the support apparatus 120.

It should be noted that the configuration of the lighting apparatus 110 is not limited to the configuration described with reference to FIG. 3. For example, the light fixture 152 itself may include a human detection sensor. The lighting apparatus may have any configuration, provided that the lighting apparatus as a whole includes a human detection sensor.

Furthermore, the light source used in the lighting apparatus is not limited to the bulb-shaped illumination light source as described in Embodiment 1 above.

Figure 10:
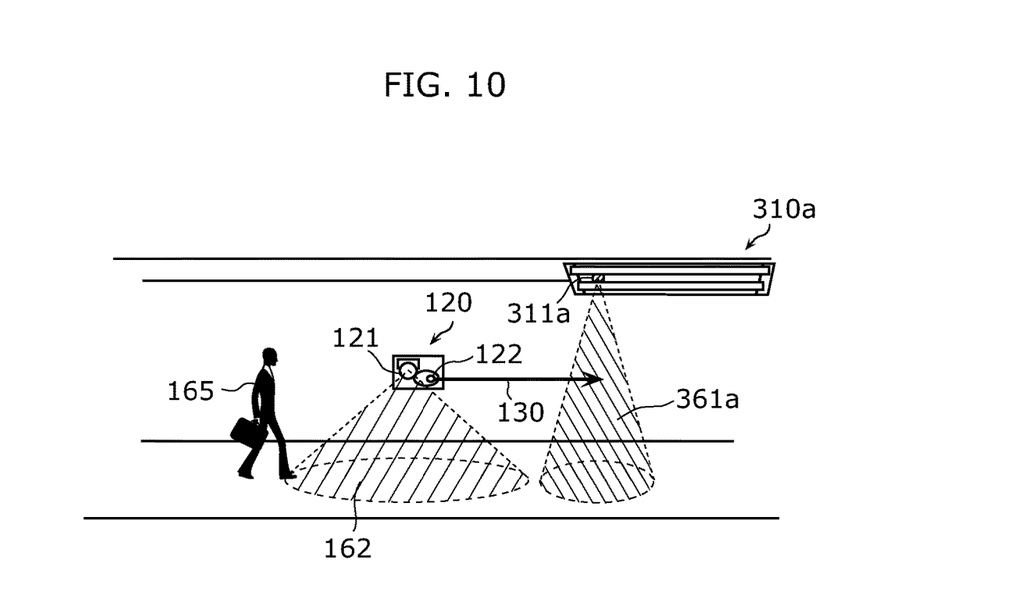
FIG. 10 is a diagram illustrating an example of a lighting system that turns ON a lighting apparatus including a straight-tube illumination light source.

FIG. 10 is a diagram illustrating an example of a lighting system that turns ON a lighting apparatus including a straight-tube illumination light source.

As illustrated in FIG. 10, a lighting apparatus 310a is a lighting apparatus including the straight-tube illumination light source. The straight-tube illumination light source may be an LED, or a so-called fluorescent light.

The lighting apparatus 310a detects, by a first human detection sensor unit 311a, infrared rays 130 emitted from the emission unit 122 to a first detection area 361a, and turns ON.

The light source used for the lighting apparatus may be, for example, a halogen lamp.

Figure 11:
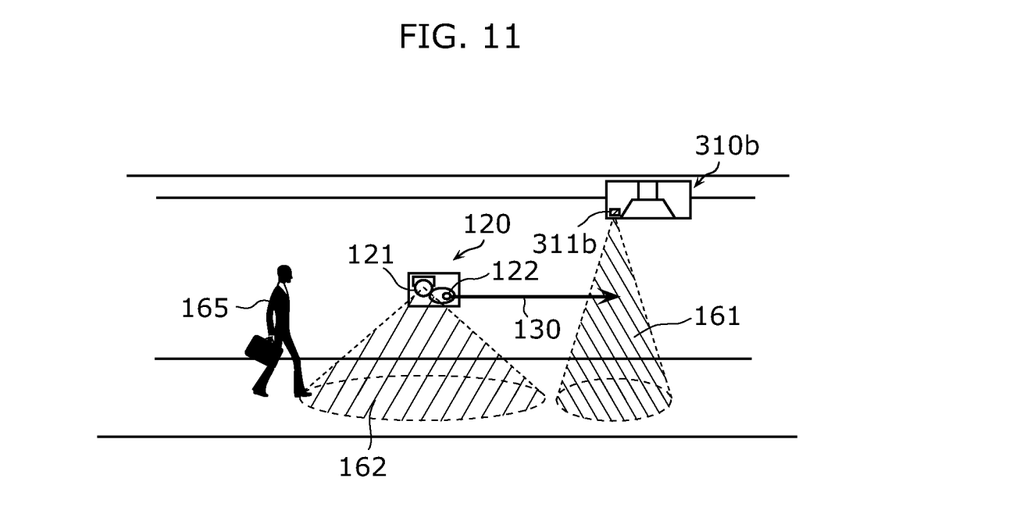
FIG. 11 is a diagram illustrating an example of a lighting system that turns ON a lighting apparatus including a halogen lamp.

FIG. 11 is a diagram illustrating an example of a lighting system that turns ON a lighting apparatus including a halogen lamp.

As illustrated in FIG. 11, a lighting apparatus 310b is a lighting apparatus including the halogen lamp. It should be noted that the lighting apparatus 310b may be a lighting apparatus including a light fixture for a halogen lamp, in which an LED lamp that fits the light fixture is provided to the light fixture.

The lighting apparatus 310b detects, by a first human detection sensor unit 311b, the infrared rays 130 emitted from the emission unit 122 to a first detection area 361b, and turns ON.

Furthermore, the light source used for the lighting apparatus may be, for example, a high intensity discharge (HID) lamp.

Figure 12:
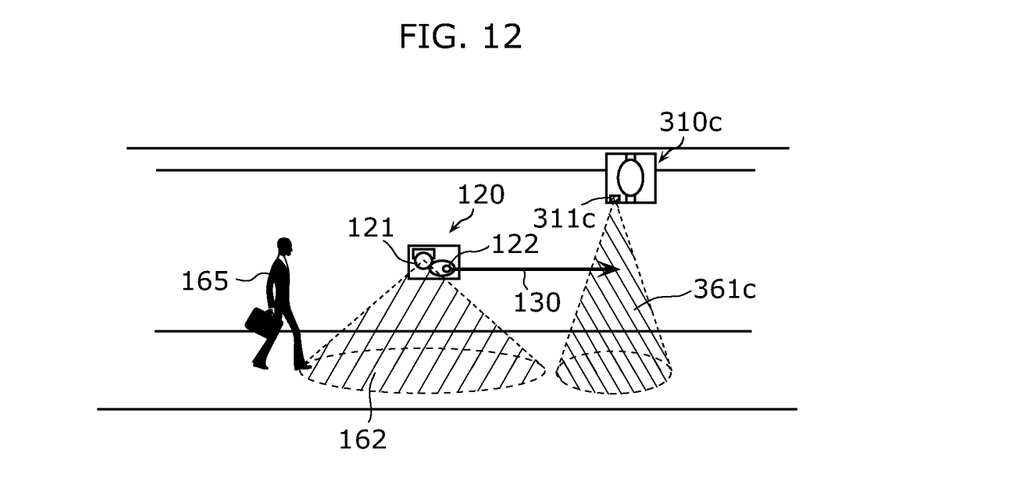
FIG. 12 is a diagram illustrating an example of a lighting system that turns ON a lighting apparatus including an HID lamp.

FIG. 12 is a diagram illustrating an example of a lighting system that turns ON a lighting apparatus including an HID lamp.

As illustrated in FIG. 12, a lighting apparatus 310c is a lighting apparatus including an HID lamp. The lighting apparatus 310c detects, by a first human detection sensor unit 311c, the infrared rays 130 emitted from the emission unit 122 to a first detection area 361c, and turns ON.

Furthermore, although not illustrated, the light source used for the lighting apparatus may be a circular LED lamp or a circular fluorescent light.

It should be noted that an example that the first and the second human detection sensor units detect infrared rays is described in Embodiment 1, but the first and the second human detection sensor units may detect, for example, ultrasonic waves or visible rays as a detection wave. Furthermore, the first and the second human detection sensor units may detect a person with a combination of infrared rays, ultrasonic waves, and visible rays. Furthermore, each of the first human detection sensor unit 111 and the second human detection sensor unit 121 may detect a different detection wave (infrared rays, ultrasonic waves, or visible rays). In any case, the emission unit 122 of the support apparatus 120 should be appropriate as long as it emits a detection wave that is detectable by the first human detection sensor unit 111.

Embodiment 2

The following describes Embodiment 2 of the present invention with reference to the drawings.

It should be noted that, in the following descriptions in Embodiment 2, the same reference signs are assigned to the same structural components as those in Embodiment 1, and the structural components having the same reference signs operate in the same manner and have the same functions as in Embodiment 1 unless otherwise specified, and therefore descriptions thereof are omitted.

In Embodiment 1, the first and second human detection sensor units detect infrared rays, and the emission unit 122 emits infrared rays. Embodiment 2 describes an example that the first and second human detection sensor units detect infrared rays as in Embodiment 1, and the emission unit 122 emits ultraviolet rays (or invisible rays) which are rays having a wavelength of 3 μm or less. In other words, an example that the emission unit 122 of the support apparatus 120 emits a detection wave that is undetectable by the first human detection sensor unit 111 is described.

Figure 13:
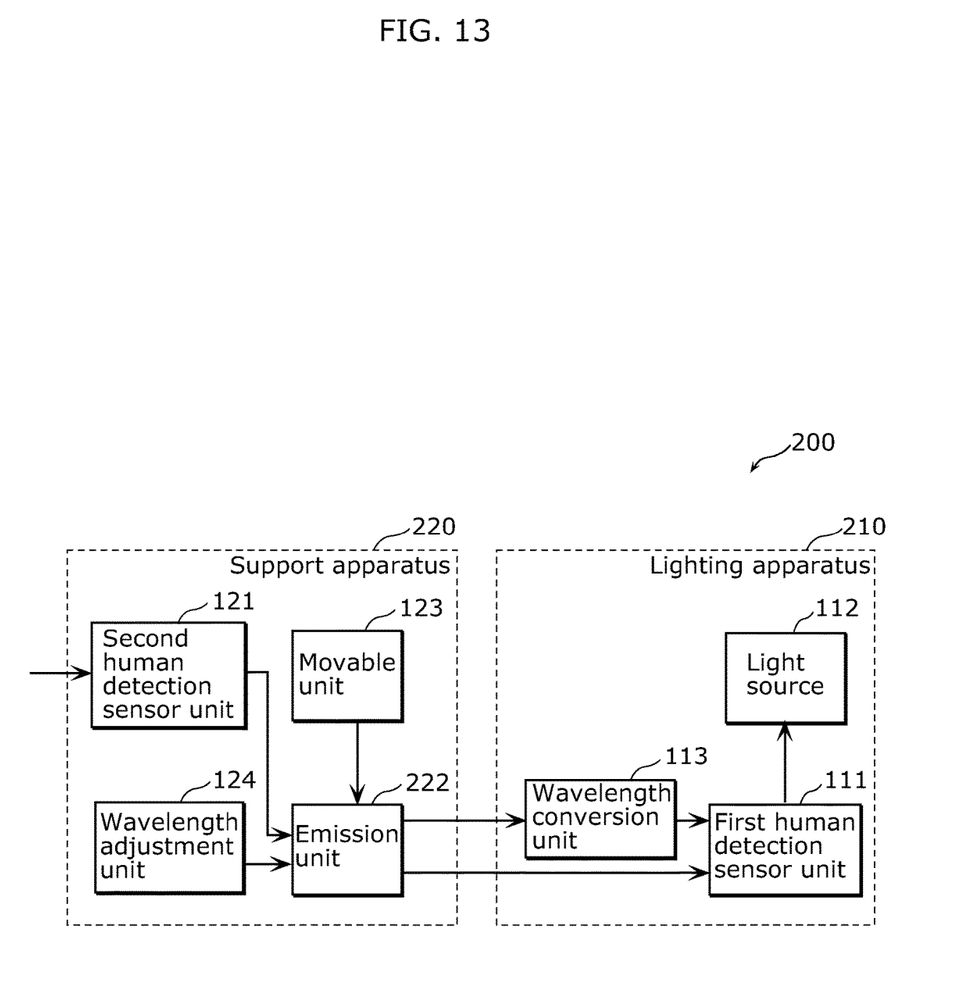
FIG. 13 is a block diagram illustrating a configuration of a lighting system according to Embodiment 2.

FIG. 13 is a block diagram illustrating a configuration of a lighting system according to Embodiment 2 of the present invention.

A lighting system 200 according to Embodiment 2 includes a support apparatus 220 and a lighting apparatus 210. As described above, the lighting system 200 differs from the lighting system 100 according to Embodiment 1 in that an emission unit 222 emits ultraviolet rays in addition to infrared rays and the lighting apparatus 210 includes a wavelength conversion unit 113 (conversion unit).

The wavelength conversion unit 113 is a material capable of converting a wavelength, that is, converting ultraviolet rays into infrared rays. It should be noted that in Embodiment 2, ultraviolet rays are electromagnetic waves having a wavelength of at least 10 nm and at most 400 nm.

In Embodiment 2, the emission unit 222 illustrated in FIG. 13 emits ultraviolet rays (invisible rays), but the first human detection sensor unit 111 is configured to detect infrared rays.

As described in Embodiment 1, infrared rays usually do not pass through materials such as polycarbonate and glass. On the other hand, ultraviolet rays can pass through the materials such as polycarbonate and glass. In other words, ultraviolet rays have an advantage of being capable of passing through a cover or the like of a light fixture.

However, in this case, the lighting apparatus 210 needs to be changed to detect ultraviolet rays. Therefore, in Embodiment 2, the wavelength conversion unit is provided to the lighting apparatus 210.

Figure 14:
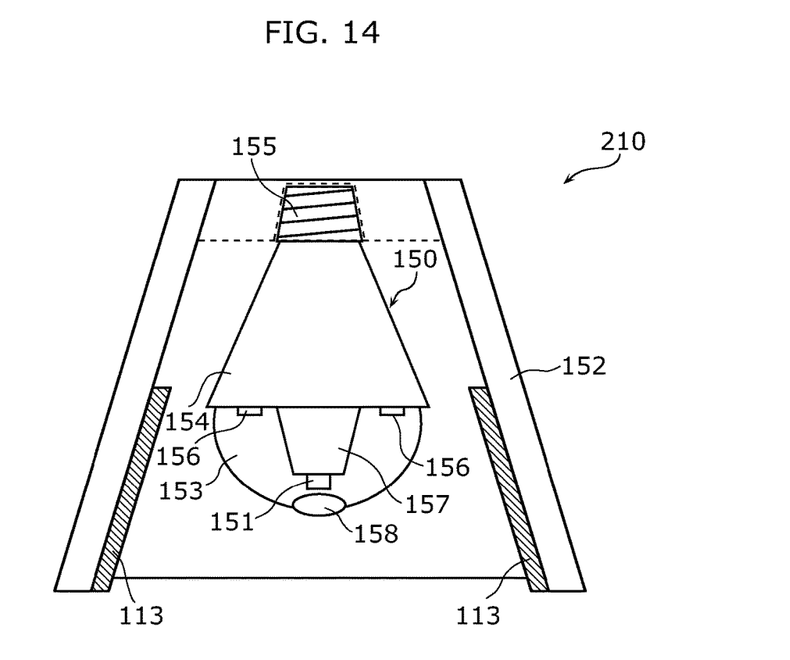
FIG. 14 is a sectional view illustrating a configuration of the lighting apparatus according to Embodiment 2.

FIG. 14 is a sectional view illustrating a configuration of the lighting apparatus 210 according to Embodiment 2.

As illustrated in FIG. 14, in the lighting apparatus 210, the wavelength conversion unit 113 is provided to an inner surface of the cover (LED lamp side) so as not to include a material that does not pass infrared rays between the wavelength conversion unit 113 and the first human detection sensor unit 111.

Such a configuration allows the first human detection sensor unit 111 to receive ultraviolet rays 230 that has passed through the cover or the like via the wavelength conversion unit 113 and identifies (detect) the ultraviolet rays 230 as infrared rays.

With this, the area (space) that has been undetectable by the first human detection sensor unit 111 by infrared rays can be made into a detectable area, and thus the detection area of the first human detection sensor unit 111 can be substantially extended.

More specifically, in Embodiment 2, the sticker-like wavelength conversion unit 113 is attached to inner surfaces of the cover of the light fixture 152 so that the first human detection sensor unit 111 is surrounded by the wavelength conversion unit 113. It should be noted that the wavelength conversion unit 113 is not limited to the sticker-like material. A material capable of converting a wavelength may be applied to the inner surfaces of the cover, or the cover itself may be made of the material capable of converting a wavelength.

Figure 15:
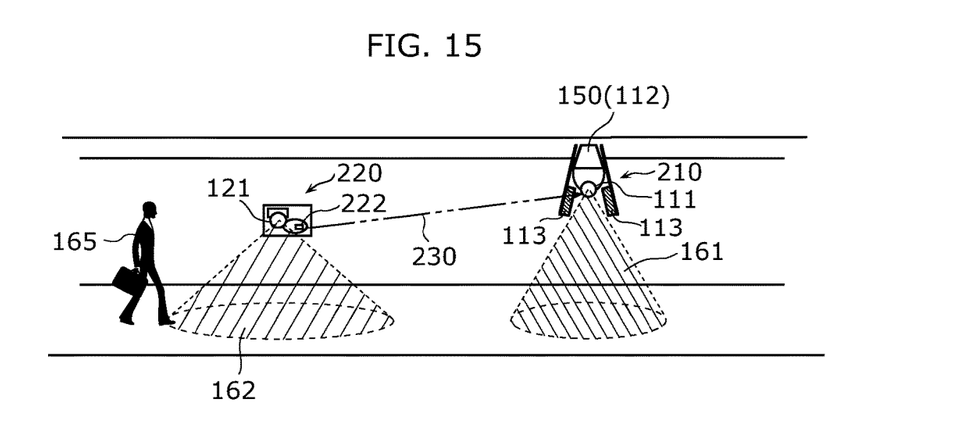
FIG. 15 is a diagram for illustrating operations of the lighting system according to Embodiment 2.

Next, operations of the lighting system 200 according to Embodiment 2 are described.

FIG. 15 is a diagram for illustrating operations of the lighting system 200 according to Embodiment 2.

First, the support apparatus 220 detects a person in the second detection area 162 by the second human detection sensor unit 121.

When the support apparatus 220 detects the person 165 in the second detection area 162 by the second human detection sensor unit 121, the support apparatus 220 emits the ultraviolet rays 230 from the emission unit 222 for the lighting apparatus 210. Here, "for the lighting apparatus 210" means toward the range in which the first human detection sensor unit 111 can detect the ultraviolet rays 230 via the wavelength conversion unit 113 as infrared rays. In other words, in FIG. 15, the wavelength conversion unit 113 and the first human detection sensor unit 111 are aligned in an emission direction of the emission unit 222, but the present invention is not limited to such a configuration.

The lighting apparatus 210 detects (identifies), by the first human detection sensor unit 111, the ultraviolet rays 230 emitted from the emission unit 222 and passed through the wavelength conversion unit 113 as infrared rays. In other words, the support apparatus 220 emits the ultraviolet rays 230 from the emission unit 222, and causes the lighting apparatus to react as if there is a person.

Next, the lighting apparatus 210 turns ON the light source 112 based on the detection by the first human detection sensor unit 111.

The foregoing has described Embodiment 2 of the present invention. In the lighting system 200 according to Embodiment 2, providing the wavelength conversion unit 113 to the lighting apparatus 210 allows the detection area of the lighting apparatus 210 to be substantially extended, even when the support apparatus 220 emits a detection wave other than infrared rays and the lighting apparatus 210 detects infrared rays.

It should be noted that in Embodiment 2, the emission unit 222 is described to emit ultraviolet rays, but the emission unit 222 should be appropriate as long as it emits electromagnetic waves that can pass through a material such as polycarbonate or glass. In other words, the emission unit 222 may emit electromagnetic waves having a wavelength less than 3 μm. In this case, a material that can convert the electromagnetic waves having a wavelength less than 3 μm into infrared rays is used for the wavelength conversion unit 113.

It should be noted that the first and second human detection sensor units in Embodiment 2 may detect, for example, ultrasonic waves, visible rays, or the like as in Embodiment 1. For example, the emission unit 222 may emit the ultraviolet rays 230, the wavelength conversion unit 113 may convert the emitted ultraviolet rays 230 into visible rays, and the first and the second human detection sensor units may detect the visible rays.

It should be noted that the present invention is not limited to the embodiments or their variations. Various modifications to the embodiments or variations that may be conceived by those skilled in the art and combinations of structural elements in different embodiments or in their variations may be included within the scope of one or more aspects of the present invention, as long as the modifications and combinations do not depart from the spirit of the present invention.

REFERENCE SIGNS LIST 10, 150 LED lamp
11 Human detection sensor
12 Light fixture
15a, 15b Detection area
100, 200 Lighting system
110, 110a, 110b, 210, 310a, 310b, 310c Lighting apparatus
111, 111a, 111b, 311a, 311b, 311c First human detection sensor unit
112 Light source
120, 120a, 120b, 120c, 220 Support apparatus
121, 121a, 121b Second human detection sensor unit
122, 122a, 122b, 122c, 222 Emission unit
123, 133c, 133d Movable unit
124 Wavelength adjustment unit
130, 130a, 130b, 130c, 130d Infrared rays
132c First emission unit
132d Second emission unit
151 Human detection sensor
152 Light fixture
153 Globe
154 Housing
155 Base
156 LED
157 Circuit case
158 Light-guiding component
161, 161a, 161b, 361a, 361b, 361c First detection area
162, 162a, 162b, 162c Second detection area
165 Person

The invention claimed is:

1. A lighting system comprising:
a lighting apparatus including a first human detection sensor unit configured to detect a person in a first detection area by detecting infrared rays radiated from a body of the person, and a light source that turns ON when the first human detection sensor unit detects the person; and
a support apparatus including (i) a second human detection sensor unit configured to detect a person in a second detection area which is different from the first detection area, and (ii) an emission unit configured to, when the second human detection sensor unit detects the person, emit a detection wave of infrared rays similar to the infrared rays radiated from the body of a person into the first detection area to cause the first human detection sensor unit to react as if the person is present in the first detection area, so as to turn ON the light source.

2. The lighting system according to claim 1,
wherein the emission unit is configured to emit the infrared rays having a wavelength of at least 3 μm and at most 15 μm.

3. The lighting system according to claim 1,
wherein the support apparatus includes a movable unit configured to change an emission direction of the detection wave to be emitted from the emission unit.

4. The lighting system according to claim 1,
wherein the support apparatus includes a wavelength adjustment unit configured to change a wavelength of the detection wave to be emitted from the emission unit.

5. The lighting system according to claim 1,
wherein the second human detection sensor unit is configured to detect the person by infrared rays,
a wavelength range of a detection wave detectable by the second human detection sensor unit is the same as a wavelength range of the detection wave to be emitted from the emission unit, and
a modulation frequency bandwidth of the detection wave detectable by the second human detection sensor unit is the same as a modulation frequency bandwidth of the detection wave to be emitted from the emission unit.

6. The lighting system according to claim 1,
wherein the emission unit is configured to emit the detection wave in at least two directions simultaneously.

7. The lighting system according to claim 1,
wherein when the first human detection sensor unit detects the person, the light source turns ON and continues to be ON for a certain period of time and
when the second human detection sensor unit detects the person in the second detection area, the emission unit is configured to emit the detection wave a plurality of times at a predetermined time interval, the predetermined time interval being shorter than the certain period of time.

8. The lighting system according to claim 1,
wherein the emission unit is configured to emit the infrared rays having a modulation frequency of 1 kHz or less.

9. The lighting system according to claim 1,
wherein the support apparatus has no illumination capabilities.

10. A support apparatus that supports detection by a lighting apparatus which turns ON when a first human detection sensor unit included in the lighting apparatus detects a person in a first detection area by detecting infrared rays radiated from a body of a person, the support apparatus comprising:
- a second human detection sensor unit configured to detect a person in a second detection area which is different from the first detection area; and
- an emission unit configured to, when the second human detection sensor unit detects the person, emit a detection wave of infrared rays similar to the infrared rays radiated from the body of a person into the first detection area to cause the first human detection sensor unit to react as if the person is present in the first detection area, so as to turn ON the light source.

11. The support apparatus according to claim 10, wherein the emission unit is configured to emit the infrared rays having a modulation frequency of 1 kHz or less.

* * * * *

UNITED STATES PATENT AND TRADEMARK OFFICE
CERTIFICATE OF CORRECTION

PATENT NO. : 10,070,501 B2
APPLICATION NO. : 14/389130
DATED : September 4, 2018
INVENTOR(S) : Akira Takahashi et al.

It is certified that error appears in the above-identified patent and that said Letters Patent is hereby corrected as shown below:

In the Drawings

Replace Drawing Sheet 2 of 8 with the attached Drawing Sheet 2 of 8.

Signed and Sealed this
Twenty-fifth Day of December, 2018

FIG. 3
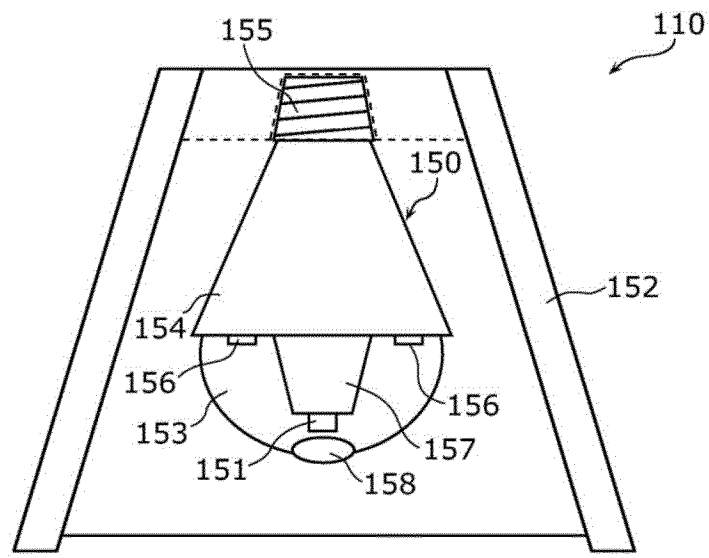
FIG. 4
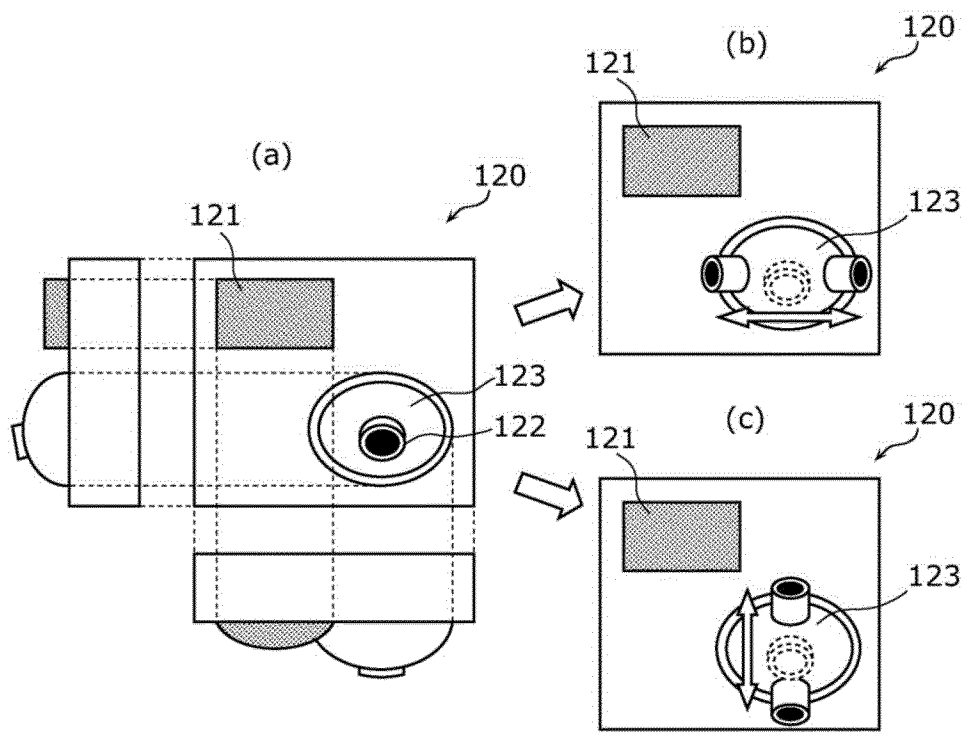

Andrei Iancu
*Director of the United States Patent and Trademark Office*